United States Patent [19]
Ebinger et al.

[11] Patent Number: 6,085,879
[45] Date of Patent: Jul. 11, 2000

[54] HYDROKINETIC TORQUE CONVERTER

[75] Inventors: Günter Ebinger, Rheinmünster; Paul Granderath, Bühlertal, both of Germany

[73] Assignee: Luk Getriebe-Systeme GmbH, Buhl/Baden, Germany

[21] Appl. No.: 09/265,740

[22] Filed: Mar. 10, 1999

[30] Foreign Application Priority Data

Mar. 12, 1998 [DE] Germany .......................... 198 10 652

[51] Int. Cl.[7] ................................................. F16H 45/02
[52] U.S. Cl. ............................................................. 192/3.3
[58] Field of Search .................................. 192/3.29, 3.3, 192/3.33

[56] References Cited

U.S. PATENT DOCUMENTS

| | | | |
|---|---|---|---|
| 3,415,345 | 12/1968 | Cadiou | 192/3.33 |
| 4,049,093 | 9/1977 | Vukovich et al. | 192/3.3 |
| 4,895,232 | 1/1990 | Kobayashi | 192/3.3 |
| 5,377,796 | 1/1995 | Friedmann et al. | |
| 5,501,309 | 3/1996 | Walth et al. | |
| 5,575,363 | 11/1996 | Dehrmann et al. | |
| 5,674,155 | 10/1997 | Otto et al. | |
| 5,738,198 | 4/1998 | Walth et al. | |
| 5,782,327 | 7/1998 | Otto et al. | |

FOREIGN PATENT DOCUMENTS 44 23 640 A1   6/1995   Germany .

*Primary Examiner*—Rodney H. Bonck
*Attorney, Agent, or Firm*—Darby & Darby

[57] ABSTRACT

A hydrokinetic torque converter wherein the axially movable piston of the bypass clutch is adjacent a substantially radially extending wall of the rotary converter housing and engages such wall when the clutch is in use to transmit torque directly between the housing an a hollow rotary output shaft of the torque converter. The piston and the wall of the housing define a plenum chamber which can receive a hydraulic fluid from a pump or can be caused to discharge fluid by way of an axial passage in the output shaft. The path between the passage and the chamber is defined in part by a coaxial projection of the wall which extends toward or into the passage and cooperates with surfaces on the piston and on the output shaft to ensure a turbulence-free flow of fluid between the chamber and the passage and to prevent stagnation of fluid in the path.

18 Claims, 2 Drawing Sheets

HYDROKINETIC TORQUE CONVERTER

BACKGROUND OF THE INVENTION

The invention relates to improvements in hydrokinetic torque converters. More particularly, the invention relates to improvements in hydrokinetic torque converters of the type wherein a housing containing a body of oil or another suitable hydraulic fluid is rotatable by the output element of a prime mover (e.g., by the camshaft or crankshaft of an internal combustion engine in the power train of a motor vehicle), a pump is confined in and rotates with the housing, a turbine is disposed in and is rotatable with and relative to the housing, a rotary output member (such as the input shaft of a change-speed transmission in the power train of the motor vehicle) is arranged to rotate with the turbine, and a fluid-operated bypass or lockup clutch is installed in the housing and is engageable to transmit torque from the housing directly to the turbine rather than by way of the pump and the body of fluid in the housing.

As a rule, the bypass clutch of a hydrokinetic torque converter employs a bypass member in the form of a piston which is movable axially of the housing to thus engage or disengage the clutch. When the bypass clutch is engaged, the piston bears upon a wall of the housing and transmits torque to the turbine, i.e., to the output member of the torque converter (e.g., to a hub which forms part of or is non-rotatably connected with the turbine as well as with the output member of the torque converter).

The piston of the bypass clutch is installed between two chambers of the housing, namely a first chamber between one side of the piston and the aforementioned wall of the housing, and a second chamber which is located between the other side of the piston and the turbine. The first chamber can receive or discharge pressurized fluid by way of an axial passage in the output member, and the second chamber can receive or discharge fluid by way of a second passage, e.g., an annular passage between the output member and a hollow shaft which surrounds the output member and can carry a stator disposed in the housing between the pump and the turbine.

Hydrokinetic torque converters are becoming increasingly popular in the power trains of motor vehicles, especially in the power trains of passenger cars, because they contribute to the comfort of the occupant or occupants. The purpose of the bypass clutch is to avoid losses in energy during those stages of operation of a motor vehicle which do not necessitate a shifting into a different gear of a transmission which is connected with the output member of the torque converter. Energy losses can develop as a result of slip between the pump and the turbine when the turbine receives torque by way of the body of fluid in the rotary housing of the torque converter. Thus, the slip is eliminated as soon as the bypass clutch is engaged before the aforementioned bypass member (piston) enables the turbine to bypass the pump, i.e., the turbine then receives torque directly from the rotary housing of the torque converter. Those surfaces of the piston and the housing wall which are in frictional contact with each other when the bypass clutch is engaged are, or can be, cooled by streamlets of fluid flowing from one of the chambers, in channels or grooves provided in the friction surface(s) of the piston and/or the wall, and into the other chamber of the housing. For example, a suitable coolant can flow from the second chamber, through the channel(s) in the torque transmitting friction surface(s) of the piston and/or the wall, through the first chamber and into the axial passage of the output member.

Reference may be had, for example, to commonly owned U.S. Pat. No. 5,501,309 granted Mar. 26, 1996 to Ernst Walth et al. for "HYDROKINETIC TORQUE CONVERTER WITH LOCKUP CLUTCH" and/or to commonly owned U.S. Pat. No. 5,782,327 granted Jul. 21, 1998 to Dieter Otto et al. for "HYDROKINETIC TORQUE CONVERTER AND LOCKUP CLUTCH THEREFOR". The disclosures of these patents, of the published German patent application Ser. No. 44 23 640 A1, as well as of all other patents and/or patent applications identified in this specification are incorporated herein by reference.

If the fluid which flows from the first chamber of the housing into the axial passage of the output member of the torque converter encounters a pronounced resistance to the flow into the axial passage, the pressure of fluid in the first chamber rises with attendant reduction or weakening of frictional engagement between the piston of the bypass clutch and the wall of the housing of the torque converter. In other words, the magnitude of the torque which can be transmitted by the engaged bypass clutch has a low or relatively low upper limit.

A proposal to increase the maximum torque which can be transmitted by the engaged bypass clutch in the housing of a hydrokinetic torque converter is disclosed in the aforementioned published German patent application Ser. No. 44 23 640 A1. It is proposed to provide several discrete conduits which can convey hydraulic fluid from the first chamber of the housing into the axial passage of the output member of the torque converter. A drawback of such proposal is that the conduits contribute to the bulk and cost of the torque converter. Furthermore, it has been found that the plural conduits offer a pronounced resistance to the flow of a hydraulic fluid therethrough, i.e., their ability to eliminate or reduce the adverse influence of the aforediscussed conventional modes of conveying fluid from the first chamber of the housing into the axial passage of the output member is nil or negligible at best.

OBJECTS OF THE INVENTION

An object of the invention is to provide a hydrokinetic torque converter whis embodies a bypass clutch and is constructed and assembled in such a way that, when engaged, the bypass clutch can transmit pronounced torques without necessitating the establishment of a complex, bulky and expensive connection between the first chamber of the housing and the axial passage in the output member of the torque converter.

Another object of the invention is to provide a novel and improved bypass or lockup clutch for use in torque converters, particularly in torque converters forming part of power trains in passenger cars and/or other types of motor vehicles.

A further object of the invention is to provide a power train employing a hydrokinetic torque converter which utilizes a bypass clutch of the above outlined character.

An additional object of the invention is to provide a novel and improved method of regulating the flow of oil or another hydraulic fluid between a chamber in the rotary housing and an axial passage in the output member of a hydrokinetic torque converter.

Still another object of the invention is to provide a method of increasing the ability of a bypass clutch to transmit pronounced torques between the housing and the output member of a hydrokinetic torque converter.

A further object of the invention is to provide a novel and improved housing for use in a hydrokinetic torque converter which is equipped with a bypass clutch.

A further object of the invention is to provide a novel rotary output member for use in a hydrokinetic torque converter embodying a bypass clutch.

Another object of the invention is to provide a novel and improved piston for use in the bypass clutch of the above outlined hydrokinetic torque converter.

An additional object of the invention is to provide a simple but effective mode of conveying fluid in a hydrokinetic torque converter in such a way that the engaged bypass clutch of the torque converter can transmit pronounced torques.

Still another object of the invention is to provide a novel and improved combination of housing and output member and/or housing and bypass member and/or housing, bypass member and output member in a hydrokinetic torque converter of the above outlined character.

SUMMARY OF THE INVENTION

The invention is embodied in a hydrokinetic torque converter which comprises a housing containing a body of oil or another suitable hydraulic fluid and being rotatable about a predetermined axis, means for rotating the housing in a predetermined direction, a pump which is disposed in and is rotatable with the housing, a turbine which is also disposed in and is rotatable with as well as relative to the housing, an output member which is rotatable with the turbine and has an axal passage, and an engageable and disengageable bypass or lockup clutch provided in the housing and being operable to transmit torque between the housing and the output member. The bypass clutch includes a bypass member which defines with a portion of the housing a plenum chamber, and the improved torque converter further comprises means for establishing an at least substantially turbulence-free path for the flow of fluid between the plenum chamber and the axial passage.

The torque converter can further comprise at least one stator which is provided in the housing between the turbine and the pump, as seen in the axial direction of the housing.

The bypass member can comprise a substantially disc-shaped fluid-operated piston which is movable in the housing in the direction of the predetermined axis into and from frictional engagement with the aforementioned portion (such as a radial wall) of the housing to thus respectively engage and disengage the bypass clutch. The piston is disposed between the turbine and the wall of the housing. The piston has a first side which is adjacent the plenum chamber and a second side adjacent a second chamber which is defined by the housing. The torque converter further comprises or is combind with a source of hydraulic fluid and means (such as a valve or a system of valves) for selectively connecting the source with the plenum chamber and the second chamber.

The aforementioned path is located at the axis of the housing and is or can be bounded by three surfaces including a first surface provided on the aforementioned wall of the housing, a second surface on the piston of the bypass clutch and a third surface on the output member. These surfaces are configured to offer little resistance to the flow of fluid between the plenum chamber and the axial passage of the output member.

In accordance with a presently preferred embodiment, the wall of the housing includes a projection which confronts the adjacent axial end of the passage, and the aforementioned first surface is provided on such projection.

The projection is or can be coaxial with the housing and extends at least close to the passage, e.g., all the way into the adjacent axial end of the passage. Such projection can have a pointed apex at or in the passage. The first surface (i.e., the surface on the projection) is or can be a concavo-conical surface which confronts the passage. Such first surface can be a rotationally symetrical surface.

The projection can constitute a separately produced part which is reliably secured to the wall of the housing, e.g., by welding, by a press fit, by one or more threaded fasteners or in any other suitable way. Alternatively, the projection can be of one piece with the wall of the housing and can be obtained by a suitable upsetting, stamping or other treatment of a blank which is being converted into the aforementioned wall of the housing.

At least one of the second and third surfaces (on the piston and on the output member, respectively) can bound that axial end of the passage wich is adjacent the projection. Such at least one surface can be designed to diverge toward the projection in the axial direction of the housing. The first surface is spaced apart from and can be at least substantially complementary to the second and/or third surface. Thus, if the first surface is a concavo-conical surface, the second and/or third surface can be a convexo-conical surface.

The path can be an at least substantially helical path which is configured to induce the fluid to flow from the plenum chamber into the axial passage in or counter to the predetermined direction (of rotation of the housing, e.g., with the output element of a prime mover in the power train of a vehicle).

The bypass member of the clutch is preferably mounted for rotation with and for axial movement along the output member.

The first, the second and/or the third surface is preferably a smooth surface; this also contributes to a reduction of resistance to the flow of oil or another fluid between the plenum chamber and the axial passage and reduces the likelihood of development of dead corners for pools of stagnant liquid.

The novel features which are considered as characteristic of the invention are set forth in particular in the appended claims. The improved hydrokinetic torque converter itself, however, both as to its construction and the modes of installing and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1b is a similar view of a structure constituting a first modification of the structure shown in FIG. 1a;

FIG. 1c is a similar view of a structure constituting a second modification of the structure shown in FIG. 1a; and FIG. 1d is a similar view of a structure constituting still another modification of the structure shown in FIG. 1a.

DESCRIPTION OF PREFERRED EMBODIMENTS

Figure 1:
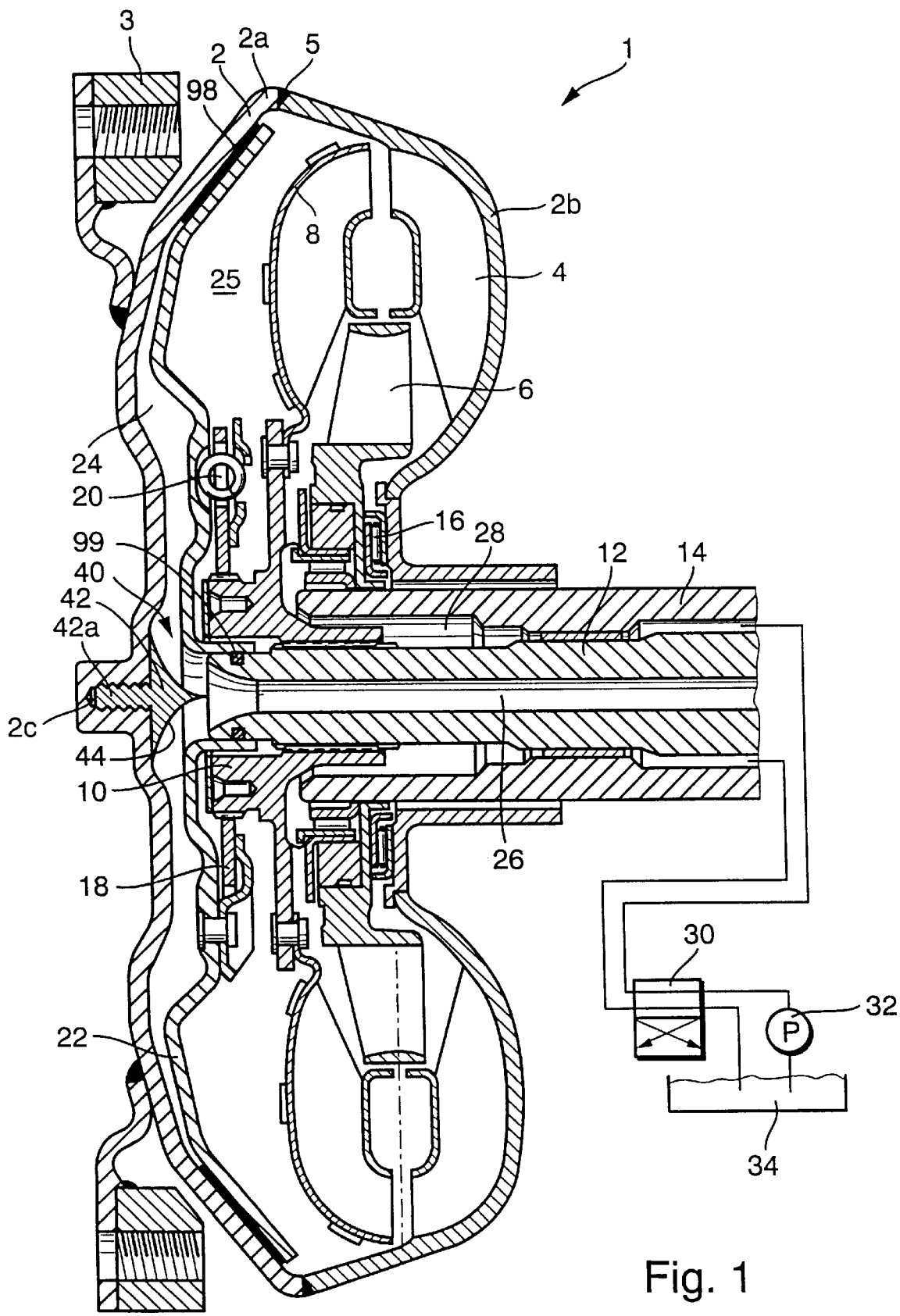
FIG. 1 is a partly schematic and partly axial sectional view of a hydrokinetic torque converter which comprises a bypass clutch and is constructed and assembled in accordance with one presently preferred embodiment of our invention.

FIG. 1 shows a hydrokinetic torque converter 1 which comprises a rotary housing 2 composed of two toroidal halves or walls 2a, 2b sealingly connected to each other by a welded seam 5. The radially outer portion of the wall 2a carries a ring 3 with an annulus of uniformly distributed tapped bores for threaded fasteners (not shown) which connect the housing 2 to the rotary output element of a prime mover (e.g., to the crankshaft or camshaft of the combustion engine in the power train of a motor vehicle). The connection can comprise a flexible plate-like member, such as the member 5 shown in FIG. 1 of commonly owned U.S. Pat. No. 5,377,796 granted Jan. 3, 1995 to Oswald Friedmann et al. for "APPARATUS FOR TRANSMITTING FORCE BETWEEN ROTARY DRIVING AND DRIVEN UNITS".

The torque converter 1 further comprises a pump 4 which is installed in and rotates with the housing 2 and can be of one piece with or fixedly secured to the wall 2b. The pump 4 can transmit torque to a turbine 8 by way of an interposed stator 6 and a body of hydraulic fluid (e.g., oil) in the internal space of the housing 2. The turbine 8 can rotate with as well as relative to the housing 2 and pump 4.

The turbine 8 has an annular hub 10 which is non-rotatably but axially movably mounted on a rotary output member 12, e.g., the input shaft of a change-speed transmission in the power train of the motor vehicle. The output member 12 is surrounded by and rotatably carries a hollow shaft 14 which supports the stator 6 between the pump 4 and the turbine 8 of the torque converter 1. The character 16 denotes a thrust bearing which is interposed between the radially inner portions of the stator 6 and pump 4.

The annular hub 10 non-rotatably but axially movably carries a supporting disc 18 which is connected to a bypass member 22 by a torsional vibration damper including an annulus of coil springs 20. These springs permit limited angular movements of the bypass member 22 and the disc 18 relative to each other, i.e., they can damp torsional vibrations of the member 22 relative to the disc 18 and/or vice versa.

The bypass member 22 constitutes the axially movable piston of a bypass or lockup clutch which can establish or interrupt a path for the transmission of torque between the housing 2 and the output member 12 by way of the turbine 8, i.e., it can bypass the customary path for the transmission of torque between the housing 2 and the turbine 8 via pump 4 and the body of hydraulic fluid in the housing 2.

The radially innermost portion of the bypass member or piston 22 (hereinafter called piston for short) constitutes a substantially cylindrical sleeve having an internal surface bounding a portion of a path 40 for the flow of hydraulic fluid between a plenum chamber 24 in the housing 2 and the left-band end of an axial passage 26 of the output member 12. The chamber 24 is disposed between the piston 22 and the adjacent radially extending portion of the wall 2a. The path 40 is further bounded by a surface at the left-hand axial end of the output member 12 as well as by a concavo-conical external surface 44 provided on a pointed projection 42 affixed to the central portion of the wall 2a and confronting the adjacent axial end of the passage 26.

The radially outermost portion of the piston 22 constitutes a hollow conical frustum and carries a friction lining 98 which bears against the friction surface of the adjacent frustoconical portion of the wall 2a when the bypass clutch is engaged.

A sealing ring 99 is interposed between the internal surface of the sleeve-like radially innermost portion of the piston 22 and the external surface of the adjacent portion of the output member 12. The sealing ring 99 can perform the additional function of axially movably centering the piston 22 on the output member 12.

The friction linings 98 can be affixed to the radially outermost portion of the piston 22 to bear against the frustoconical friction surface of the wall 2a in the engaged condition of the bypass clutch. Alternatively, the wall 2a can carry its own friction linings which are engageable with the friction linings 98, or the bypass clutch can employ a single set of friction linings on the wall 2a or the bypass clutch can operate without friction linings.

The plenum chamber 24 is located at one side of the piston 22, and the other side of this piston is adjacent a second chamber 25 at the left-hand side of the turbine 8. The bypass clutch is engaged when the pressure of fluid in the chamber 24 is less than the pressure of fluid in the chamber 25. The chamber 24 can receive pressurized fluid from a source 34 (e.g., a sump) by way of a pump 32, a fluid flow direction selecting valve 30, the axial passage 26 in the output member 12, and the path 40 at the projection 42. The chamber 25 can receive fluid from the source 34 via pump 32, valve 30 and the annular passage 28 between the output member 12 and the hollow shaft 14. The pump 32 can be driven by the output element of the prime mover which rotates the housing 2, e.g., by way of the housing 2 or pump 4. The valve 30 can constitute a single valve or it can constitute or include a set of valves which can direct hydraulic fluid from the source 34 into the chamber 24 and simultaneously from the chamber 25 into the source, or vice versa. Signals for operation of the valve 30 or an equivalent thereof can be supplied by an electronic control circuit of the type employed in certain presently known power trains for motor vehicles. Reference may be had, for example, to commonly owned U.S. Pat. No. 5,674,155 granted Oct. 7, 1997 to Dieter Otto et al. for "METHOD OF AND APPARATUS FOR TRANSMITTING TORQUE IN THE POWER TRAINS OF MOTOR VEHICLES".

The bypass clutch including the piston 22 is disengaged when the valve 30 is set to admit pressurized fluid from the outlet of the pump 32 into the plenum chamber 24 by way of the axial passage 26 and path 40. At such time, the valve 30 permits hydraulic fluid to leave the second chamber 25 via annular passage 28 and to flow back to the source 34. Inversely, the bypass clutch is engaged when the valve 30 causes pressurized fluid to flow from the outlet of the pump 32, via annular passage 28, and into the second chamber 25 while the fluid is free to leave the plenum chamber 24 via path 40 and axial passage 26 of the output member 12. When the bypass clutch is disengaged (because the piston 22 does not receive torque from the wall 2a), the prime mover can drive the output member 12 by way of the housing 2, pump 4, the body of fluid in the housing, the turbine 8 and the hub 10.

The energy storing means (coil springs) 20 becomes effective when necessary to take up torsional vibrations between the piston 22 on the one band, and the member 18 and hub 10 on the other hand.

The manner in which the bypass clutch can be cooled by fluid flowing between the chambers 24, 25 along the friction linings 98 when the friction linings bear against the wall 2a is or can be the same as disclosed in the aforementioned U.S. Pat. Nos. 5,501,309 and 5,738,198. Such cooling is particularly desirable when the friction linings 98 slip relative to the wall 2a (and/or vice versa) while the bypass clutch is called upon to transmit a pronounced torque from the wall 2a to the hub 10 of the turbine 8 (by way of the energy storing means 20 and the member 18).

The flow of fluid (such as the fluid which leaks from the chamber 25 into the chamber 24 in the engaged condition of the bypass clutch) from the chamber 24 into the axial passage 26 of the output member 12 should take place without causing an excessive rise of fluid pressure (counterpressure) in the chamber 24 because the overly pressurized fluid in the chamber 24 would oppose the frictional engagement between the friction linings 98 and the wall 2a and would thus reduce the maximum torque which the engaged bypass clutch could transmit between the wall 2a and the piston 22, i.e., between the prime mover and the output member 12 via turbine 8 rather than by way of the pump 4, hydraulic fluid and turbine 8.

The illustrated path 40 is configured in such a way that it does not establish any dead corners or spaces for the accumulation of one or more stagnant bodies of fluid which could interfere with an optimum flow of fluid from the chamber 24 into the axial passage 26 of the output member 12 in the engaged condition of the bypass clutch.

The projection 42 on the wall 2a resembles a cone having an apex located at or extending into the adjacent end of the axial passage 26. The cone has a concave rotationally cylindrical surface 44 which is complementary to the composite convex surface defined by the output member 12 and piston 22. The illustrated projection 42 can be said to resemble or constitute a rotational hyperboloid and the surface 44 is a hyperboloid of revolution.

The projection 42 has an axial extension or stub 42a which is received (e.g., as a press fit) in a centrally located complementary socket 2c provided in the right-hand surface of the wall 2a. However, it is equally possible to secure the projection 42 (if such projection is a separately produced part) in a number of other ways; this will be described with reference to FIGS. 1a, 1b and 1c. The illustrated projection 42 is made of a metallic material; however, it is equally possible to employ a projection which is made of a suitable plastic or other non-metallic material.

The cross-section of the path 40 increases gradually from the constant-diameter portion of the axial passage 26 toward the radially inner portion of the chamber 24. As already mentioned hereinbefore, the surfaces of the parts 42, 22 and 12 bounding the path 40 are preferably smooth; this also contributes to prevention of the development of eddies, vortices and other forms of turbulence in the path 40 as well as to the prevention of the development of the aforementioned dead spaces for the accumulation of stagnant bodies of hydraulic fluid which could unduly interfere with the flow of fluid between the passage 26 of the output member 12 and the chamber 24.

As shown in FIGS. 1, 1a, 1b and 1d, the apex of the projection can extend to the adjacent end of the axial passage in the output member. Alternatively, and as shown in FIG. 1c, the apex of the projection can actually extend into the axial passage. This depends upon the configuration of the surfaces bounding the path 40. The pronounced apex is a frequently desirable but not indispensable feature of the projection.

An advantage of the feature that the plenum chamber 24 is defined only by the wall 2a and the piston 22 of the bypass clutch, and that the chamber 24 communicates directly with the axial passage 26 (by way of the path 40), is that it is simpler and less expensive to impart to the surfaces of the parts 2a, 22 a desirable streamlined shape free of edges, rims, shoulders or other pronounced protuberances. The configuration of the chamber 24 is preferably such that the cross-sectional area of its radially inner portion decreases smoothly and gradually toward the path 40. The concavo-conical external surface 44 of the projection 42 ensures a gradual and predictable deflection of the fluid flow from radially inwardly toward the common axis of the housing 2 and output member 12 and thereupon toward and into the main portion of the the passage 26 leading to the valve 30.

The radially inwardly advancing stream of hydraulic fluid flowing from the chamber 24 into the passage 26 (e.g., as a result of coolant flow from the chamber 25, along the friction linings 98 and into the chamber 24) is acted upon by Coriolis forces as a result of rotation of the wall 2a and piston 22, and this induces a smooth deflection of the radially inwardly flowing fluid in the form of what can be termed a "macro vortex" which advances along the path 40 and into the axial passage 26. The action of Coriolis forces upon the radially inwardly flowing fluid is highly beneficial because this contributes significantly to the prevention of development of eddies, vortices and bodies of stagnant fluid which could entail an undesirable rise of fluid pressure in the chamber 24 and the resulting reduction of torque which the bypass clutch could transmit from the wall 2a to the output member 12 via piston 22, energy storing means 20, member 18 and hub 10.

Additional advantages can be achieved, at least under certain circumstances, if the surfaces bounding the path 40 and preferably also the radially innermost portion of the chamber 24 are imparted a helical shape. The outlines of the spiral conform to the extent of fluid deflection under the influence of Coriolis forces.

Figure 1A:
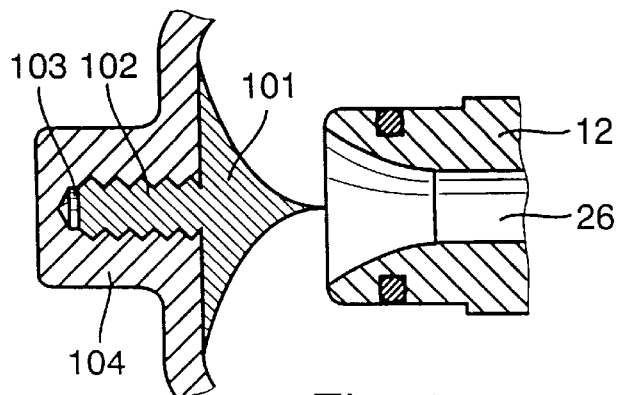
FIG. 1a is an enlarged fragmentary axial sectional view a structure which defines a novel path for the flow of a hydraulic fluid between a chamber in the housing and an axial passage in the output member of the improved torque converter.

FIG. 1a shows a portion of the output member 12 and its axial passage 26, as well as a portion of a wall 104 (corresponding to the wall 2a of the housing 2 shown in FIG. 1) and a separately produced projection 101 having a concavo-conical exposed surface confronting the adjacent end of the passage 26. The projection 101 has an axial extension or stub 102 received in a socket 103 of the wall 104. The stub 102 can be a press fit in the socket 103; alternatively, the socket can constitute a tapped blind bore which receives the externally threaded stub. It is also possible to secure the projection 101 to the wall 104 in several ways, e.g., by resorting to a press fit and an adhesive, by resorting to riveting and bonding and/or other undertakings.

Figure 1B:
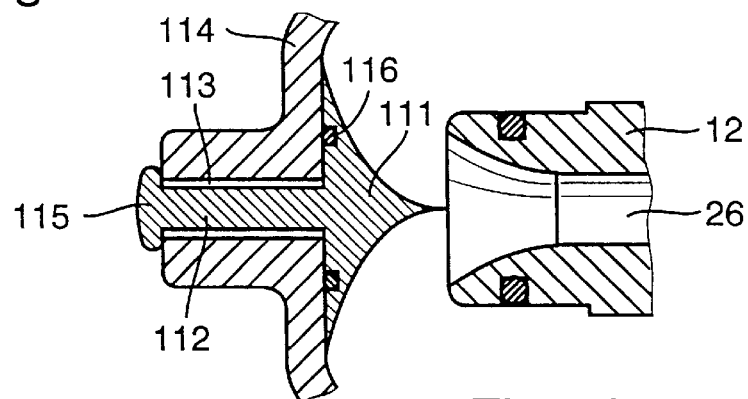
Figure 1C:
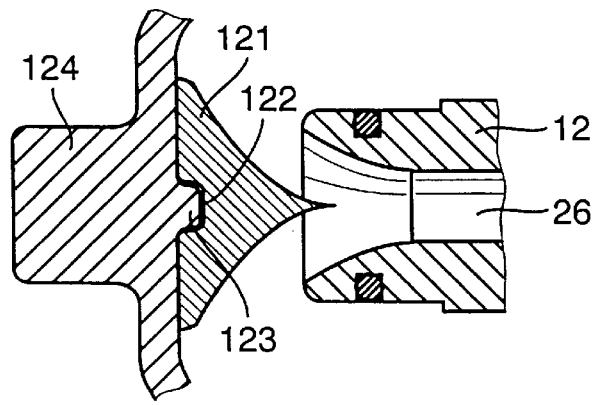

The projection 111 of FIG. 1b has an extension or shank 112 which extends through and beyond a centrally located bore or hole 113 of the wall 114 and has a rivet head 115 at the outer side of the wall 114. A sealing element 116 (e.g., an O-ring) is installed between the projection 111 and that side of the wall 114 which confronts the output member 12. The extension 112 can constitute a cylindrical shank which may but need not be a press fit in the hole or bore 113. The head 115 can be dimensioned and configurated to seal the outer end of the bore or hole 113; in such instance, the O-ring 116 can constitute an optional feature of the torque converter embodying the structure shown in FIG. 1b.

FIG. 1c shows a wall 124 having a centrally located cylindrical protuberance 123 extending into a complementary socket 122 of a projection 121 having an apex extending into the adjacent end of the axial passage 26 in the rotary output member 12. The wall 124 can constitute a stamping, and the projection 121 can be glued, welded or otherwise secured to such wall in addition to the connection which is established by the male and female parts 123, 122. It is also possible to provide the protuberance 123 with external threads mating with internal threads in the socket 122 of the projection 121.

Figure 1D:
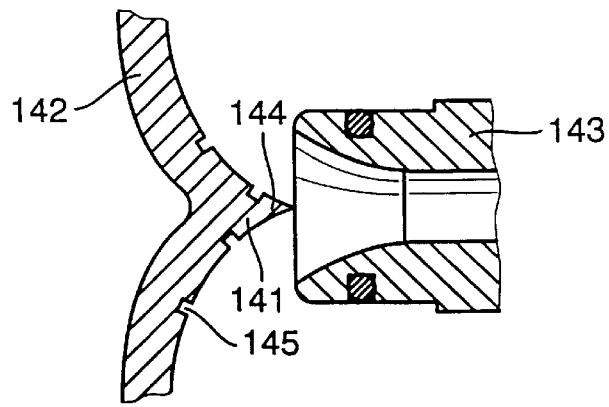

FIG. 1d shows a projection 141 which is of one piece with the wall 142 and has a pointed tip or apex 144 at the adjacent end of the axial passage in the rotary output member 143. The projection 141 can be formed in a deep drawing or embossing or analogous machine. The apex 144 may but not have a flattened or rounded terminal.

The concavo-conical exposed surface of the projection 141 has one or more helical grooves 145. Such helical configuration(s) can be provided in addition to or in lieu of analogous helical configuration(s) on one or more surfaces bounding the path corresponding to the path 40 in the torque converter 1 of FIG. 1 and being defined in part by the projection 141 of FIG. 1d. The helical groove or grooves 145 can be formed in the aforementioned deep drawing or analogous machine.

In each instance, the projection (42, 101, 111, 121 or 141)) and the surfaces bounding the adjacent end of the axial passage in the output member 12 or 143 can be configurated and dimensioned to ensure a smooth (turbulence-free) change in the direction of fluid flow from radially inwardly to axially of the housing of the improved torque converter. In addition, the bulk of the projection 42, 101, 111, 121 or 141 greatly reduces the likelihood of stagnation of fluid in the aforementioned path.

The utilization of a simple projection on the radially extending wall 2a, 104, 114, 124 or 142 of the housing contributes to the simplicity of the improved torque converter, especially when its design is compared with that which is disclosed in the aforementioned published German patent application Ser. No. 44 23 640 A1.

Another important advantage of the improved hydrokinetic torque converter is that its novel features can be retrofitted into many existing models of torque converters. This holds particularly true for the embodiments which are shown in FIGS. 1 and 1a to 1c, i.e, to the embodiments which employ separately produced projections.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of hydrokinetic torque converters and, therefore, such adaptations should and are intended to be comprehended within the meaning and range of equivalence of the appended claims.

What is claimed is:

1. A hydrokinetic torque converter, comprising:
 a housing confining a body of hydraulic fluid and being rotatable about a predetermined axis;
 means for rotating said housing in a predetermined direction;
 a pump disposed in and rotatable with said housing;
 a turbine disposed in and rotatable with and relative to said housing;
 an output member rotatable with said turbine and having an axial passage;
 an engageable and disengageable bypass clutch provided in said housing and operable to transmit torque between said housing and said output member, said clutch including a bypass member comprising a piston, defining with a portion of said housing a plenum chamber; and
 means for establishing a path for the flow of fluid between said chamber and said passage, wherein said path is located at said axis, said portion of said housing, said piston and said output member respectively having first, second, and third surfaces bounding said path and being configured to offer little resistance to the flow of fluid between said plenum chamber and said passage, wherein said portion of said housing includes a projection confronting said passage, said first surface being provided on said projection.

2. The torque converter of claim 1, further comprising at least one stator provided in said housing between said turbine and said pump, as seen in the direction of said axis.

3. The torque converter of claim 1, wherein said bypass member comprises a substantially disc-shaped fluid-operated annular piston movable in said housing in the direction of said axis into and from frictional engagement with said portion of said housing to thus respectively engage and disengage said clutch, said piston being disposed between said turbine and said portion of said housing.

4. The torque converter of claim 3, wherein said piston has a first side adjacent said plenum chamber and a second side adjacent a second chamber defined by said housing, and further comprising a source of hydraulic fluid and means for selectively connecting said source with said plenum chamber and said second chamber.

5. The torque converter of claim 1, wherein said projection extends at least close to said passage and is at least substantially coaxial with said housing.

6. The torque converter of claim 1, wherein said projection extends into said passage.

7. The torque converter of claim 1, wherein said projection has a pointed apex at said passage.

8. The torque converter of claim 1, wherein said first surface is a concavo-conical surface confronting said passage.

9. The torque converter of claim 8, wherein said first surface is a rotationally symmetrical surface.

10. The torque converter of claim 1, wherein said projection is a separately produced part, and further comprising means for securing said separately produced part to said housing.

11. The torque converter of claim 1, wherein said passage has an end portion adjacent said projection, at least one of said second and third surfaces bounding said end portion of said passage and diverging toward said projection in the direction of said axis.

12. The torque converter of claim 11, wherein said first surface is spaced apart from and is at least substantially complementary to said at least one of said second and third surfaces.

13. The torque converter of claim 12, wherein said first surface is a concavo-conical surface and said at least one of said second and third surfaces is a convexo-conical surface.

14. The torque converter of claim 1, wherein said path is an at least substantially helical path.

15. The torque converter of claim 14, wherein said helical path is configurated to induce a flow of fluid from said plenum chamber into said passage in said predetermined direction.

16. The torque converter of claim 14, wherein said helical path is configurated to induce a flow of fluid from said plenum chamber into said passage counter to said predetermined direction.

17. The torque converter of claim 1, wherein said bypass member is rotatable with and movable along said output member in the direction of said axis.

18. The torque converter of claim 1, wherein said means for rotating said housing comprises a rotary output element of an engine in the power train of a motor vehicle.

* * * * *